(12) United States Patent
Ponzio et al.

(10) Patent No.: US 11,063,500 B2
(45) Date of Patent: Jul. 13, 2021

(54) METHOD AND APPARATUS FOR MANUFACTURING A STATOR OF A DYNAMO-ELECTRIC MACHINE

(71) Applicant: ATOP S.p.A., Florence (IT)

(72) Inventors: Massimo Ponzio, Siena (IT); Rubino Corbinelli, Siena (IT); Davide Chesi, Florence (IT)

(73) Assignee: ATOP S.p.A., Florence (IT)

( * ) Notice: Subject to any disclaimer, the term of this patent is extended or adjusted under 35 U.S.C. 154(b) by 287 days.

(21) Appl. No.: 16/346,701

(22) PCT Filed: Nov. 14, 2017

(86) PCT No.: PCT/IB2017/057101
§ 371 (c)(1),
(2) Date: May 1, 2019

(87) PCT Pub. No.: WO2018/092022
PCT Pub. Date: May 24, 2018

(65) Prior Publication Data
US 2019/0280577 A1   Sep. 12, 2019

(30) Foreign Application Priority Data
Nov. 16, 2016  (IT) .................. 102016000115749

(51) Int. Cl.
*H02K 15/04* (2006.01)
*H02K 15/02* (2006.01)
(Continued)

(52) U.S. Cl.
CPC ......... *H02K 15/0421* (2013.01); *H02G 1/128* (2013.01); *H02K 15/024* (2013.01);
(Continued)

(58) Field of Classification Search
CPC ........... H02K 15/0068; H02K 15/0087; H02K 15/024; H02K 15/0414; H02K 15/0421;
(Continued)

(56) References Cited

U.S. PATENT DOCUMENTS

| 4,970,367 A | * | 11/1990 | Miller | .................... H02G 1/128 |
| | | | | 219/121.68 |
| 6,546,617 B1 | | 4/2003 | Hayashi et al. | |

(Continued)

FOREIGN PATENT DOCUMENTS

| JP | H0919115 | 1/1997 |
| WO | WO 2012/156066 | 11/2012 |

*Primary Examiner* — Peter Dungba Vo
*Assistant Examiner* — Joshua D Anderson
(74) *Attorney, Agent, or Firm* — Jeffrey H. Ingerman; Jason S. Ingerman; Haley Guiliano LLP

(57) ABSTRACT

The method and apparatus comprise the following features: —forming coil members (21) by bending an electric conductor (20) externally coated with an outer insulation (20'); wherein the bending is made at predetermined lengths from a reference position (16'), and wherein each one of the coil members (21), when formed, comprises at least one head portion (21') and leg portions (21") extending from said at least one head portion (21'); —feeding the electric conductor (20) to accomplish the bending; —cutting the electric conductor (20) to detach a formed coil member (21) from said electric conductor (20); —inserting the leg portions (21") of the coil members (21) into slots of the stator, so that parts of said leg portions (21") extend from one end of the stator and the head portions (21') extend from an opposite end of the stator; —arranging at least one laser beam (13'a, 13'b) to remove the insulation (20') from predetermined areas (20a, 20b) of the electric conductor (20); —radiating the surface of the electric conductor (20) with said at least one laser beam (13'a, 13'b) situated at a predetermined position (IP, 2P) with respect to the reference position (16')

(Continued)

along the length of the electric conductor (20) being fed, and at a predetermined stage of the bending of a coil member (20).

19 Claims, 3 Drawing Sheets

(51) Int. Cl.
  *H02K 15/06* (2006.01)
  *H02G 1/12* (2006.01)
(52) U.S. Cl.
  CPC ...... *H02K 15/064* (2013.01); *Y10T 29/49009* (2015.01); *Y10T 29/53143* (2015.01)
(58) Field of Classification Search
  CPC .............. H02K 15/0428; H02K 15/064; Y10T 29/49009; Y10T 29/49012; Y10T 29/49073; Y10T 29/49194; Y10T 29/49192; Y10T 29/53143; Y10T 29/53161; H02G 1/005; H02G 1/12; H02G 1/1248; H02G 1/12569; H02G 1/1275; H02G 1/128; B21F 11/00; B21F 15/02; B21F 15/06
  See application file for complete search history.

(56) References Cited

U.S. PATENT DOCUMENTS

| | | | |
|---|---|---|---|
| 6,865,796 B1* | 3/2005 | Oohashi | H02K 3/12 242/432 |
| 7,480,987 B1* | 1/2009 | Guercioni | H02K 15/0421 29/592.1 |
| 7,947,921 B2* | 5/2011 | McFall | H02G 1/128 219/121.69 |
| 10,439,462 B2* | 10/2019 | Hirao | H02K 3/30 |

* cited by examiner

METHOD AND APPARATUS FOR MANUFACTURING A STATOR OF A DYNAMO-ELECTRIC MACHINE

TECHNICAL FIELD

The present invention relates to a method and apparatus for manufacturing a stator of a dynamo-electric machine, and more particularly, to a method and apparatus for removing insulation material from an electric conductor used for forming coil members of a coil assembly of the stator.

BACKGROUND ART

Coil members, such as U-shaped members, also referred to as hairpins, require that the insulation covering be removed from the conductive core surrounding the electric conductor. This allows joining of uninsulated cores of the electric conductor by means of welding operations, or other joining techniques.

Patent publication WO 2012/156066 discloses methods and apparatuses for forming the coil members like hairpins by bending the end of an electric conductor fed from a supply reel. A formed coil member has ends, which are cut to free the formed coil member from the electric conductor supplied to form the coil member.

Welding machines for joining the ends of hairpins have been described in patent publication WO 2012/119691.

A typical manufacturing cycle for producing a finished stator core, wound with coil members like hairpins, generally includes:
- forming the coil members from an electric conductor,
- assembling multiple coil members to form the complete coil assembly of the stator core,
- inserting the coil assembly into the stator core by inserting the legs of the coil members into the slots of the stator core,
- twisting the portions of the legs of the coil members that protrude from the stator to bring such portions into welding positions,
- welding said portions.

Removing insulation from the electric conductor at the forming stage of the coils members simplifies and optimizes successive welding operations of the portions where the insulation has been removed.

SUMMARY OF THE INVENTION

It is an object of the invention to provide a laser solution for removing insulation from portions of an electric conductor, which is fed to a bending unit where a coil member is formed.

It is further object of the invention to accomplish the removing of the insulation during the bending operations to form the coil member.

According to the present invention, these and other objects are achieved through a method and an apparatus as set out in the appended independent claims.

It is to be understood that the appended claims are an integral part of the technical teachings provided in the following detailed description of the present invention. In particular, the dependent claims appended hereto define some exemplary embodiments of the present invention, which include some optional technical features.

Further features and advantages of the present invention will become apparent in the light of the following detailed description provided merely by way of non-limiting example with particular reference to the annexed drawings, which will be briefly described below.

DETAILED DESCRIPTION OF THE INVENTION

Figures 1, 1A:
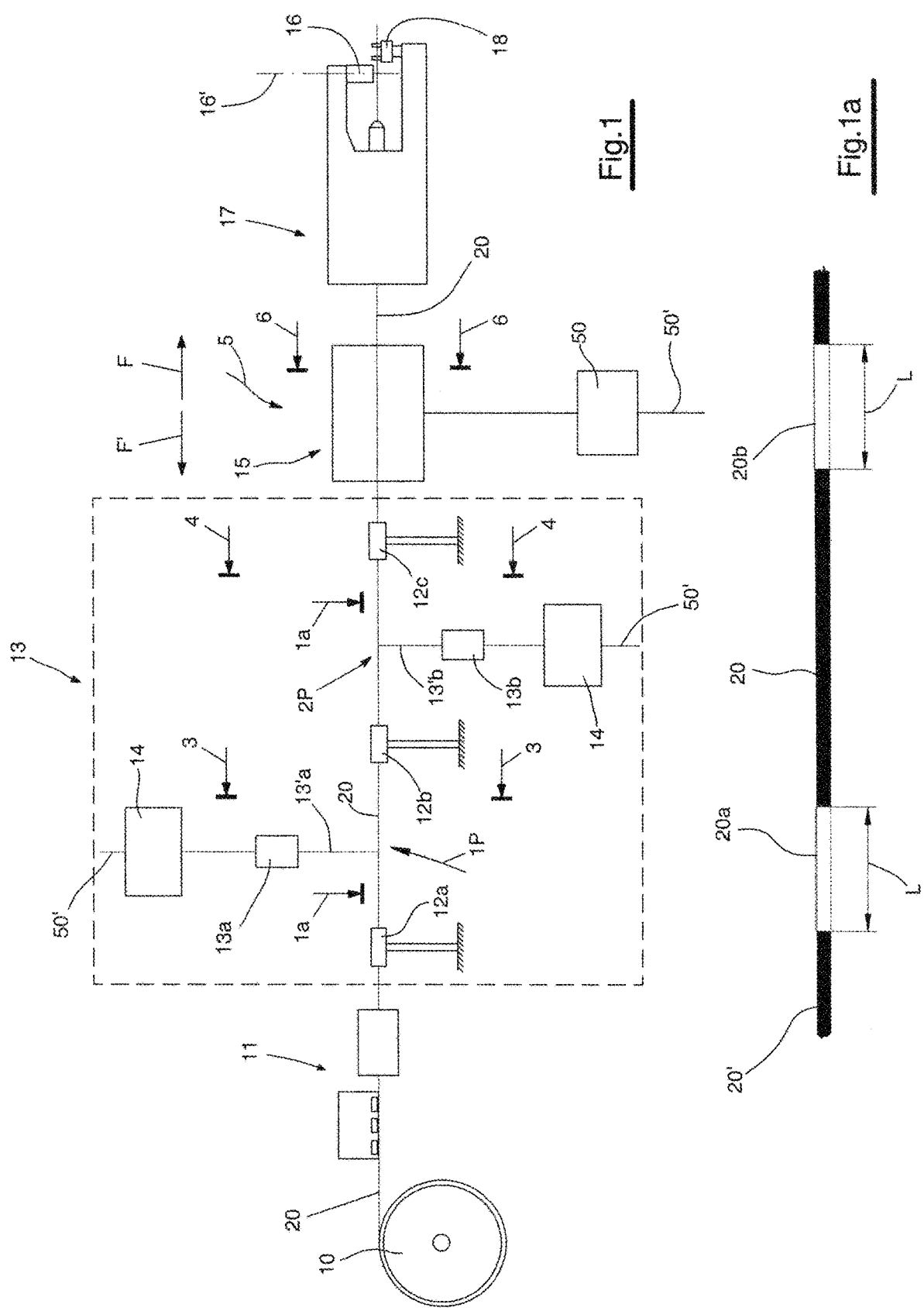
FIG. 1 is an elevation view of an apparatus made in accordance with an exemplary embodiment of the present invention, according to a schematic representation thereof.
FIG. 1a is a view seen in the direction indicated by arrows 1a-1a of an electric conductor.
Figure 2:
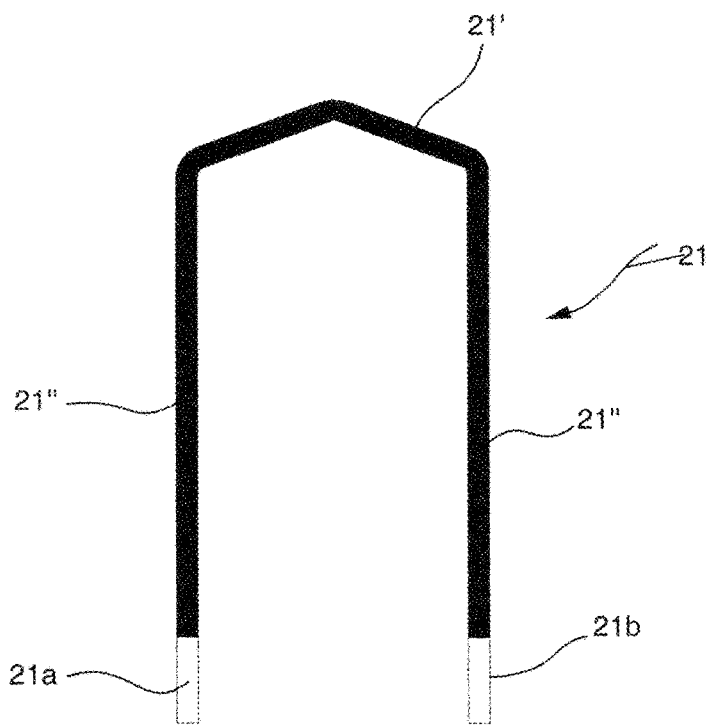
FIG. 2 is a plan view of a coil member manufactured according to the principles of the invention.

FIG. 1 schematically shows an exemplary embodiment of the present invention, wherein a supply reel 10 is rotated to feed the electric conductor 20 employed for forming a U-shaped member, also referred to as hairpin, shown in FIG. 2.

As is known in the industry, the electric conductor 20 has a conductive inner core surrounded by an insulation 20', which is electrically insulating and externally coats the core.

The electric conductor 20 leaving the supply reel 10 passes through a straightening unit 11 (which may include, for example, rollers) for removing any bends or folds that might be present in the electric conductor 20. In this way, the electric conductor 20 is accurately aligned for the next operations that will have to be carried out.

Figure 3:
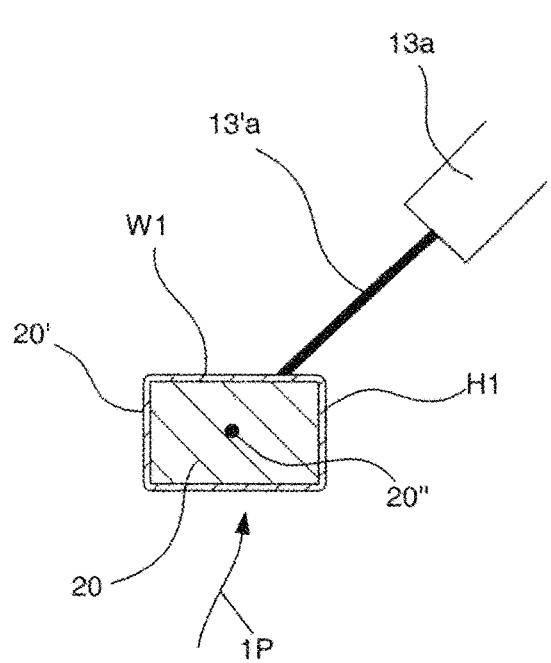
FIG. 3 is a partial sectional view, as seen from the direction of the arrows 3-3 of FIG. 1.
Figure 4:
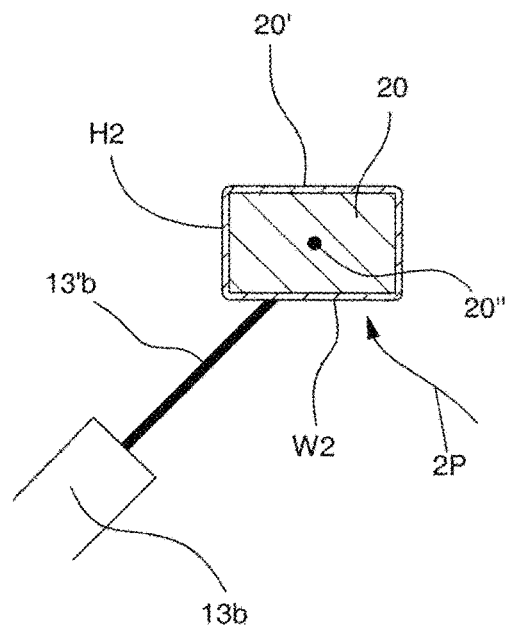
FIG. 4 is a partial sectional view, as seen from the direction of the arrows 4-4 of FIG. 1.

Subsequently, the electric conductor 20 passes through a laser unit 13 for removal of the insulation 20'. More particularly, predetermined lengths L of insulation 20' are removed from the electric conductor 20 at predetermined positions along said electric conductor 20, as shown in FIGS. 1a, 3 and 4. With particular reference to FIGS. 1a, 20a and 20b designate removal areas that represent those portions or areas of the conductor 20 where the predetermined lengths L of insulation 20' have been removed.

With reference to FIGS. 1, 3 and 4, laser unit 13 is provided with a first laser source 13a configured for generating a first laser beam 13'a capable of scanning the surface of the electric conductor 20 in a first position, indicated by arrow 1P. Preferably, the laser unit 13 is also provided with a second laser source 13b configured for configured for generating a second laser beam 13'b capable of scanning the surface of the electric conductor 20 in a second position 2P. Positions 1P and 2P are fixed with respect to an absolute reference; in other words, they represent positions through which the electric conductor 20 passes as it is fed from supply reel 10.

According to one embodiment of the invention, each of laser sources 13a and 13b generates a pulsed laser beam 13'a, 13'b having a spot configuration radiated on a zone of the surface of the electric conductor 20. Operationally there are multiple zones which are radiated by the spot configuration and which make the removal areas 20a and 20b of the electric conductor 20 where insulation removal occurs. The laser beams 13'a and 13'b move with respect to the electric conductor 20 in order to achieve a succession of radiations of the spot configuration on the above-mentioned multiple zones. In other words, the laser beams 13'a and 13'b scan the removal areas 20a and 20b by means of the spot configuration of the laser beams 13'a and 13'b.

More precisely, the scanning of a laser beams 13'a and 13'b consists of the spot configuration moving along predetermined trajectories of the surface of the electric conductor 20, which result in removal areas 20a and 20b.

The predetermined trajectories can be multiple linear paths adjacent to each other, on which the spot configuration moves in succession. This results in the spot configuration moving in forward and reverse directions along the linear paths, one after the other. Adjacent linear paths can also be partially superimposed to ensure sufficient coverage or radiation of the removal areas 20a and 20 by the laser beam.

When the spot configuration is radiating a zone of the trajectories, the heating energy of the laser beam causes the underlying insulation 20' to melt into a gaseous state. This results in the removal of the insulation 20' to expose the conductive core of the electric conductor 20 in the removal areas 20a and 20b.

Each laser source 13a, 13b can be provided with a reflecting device or mirror for moving the laser beam 13'a, 13'b along the trajectories required for removing the insulation from the removal areas 20a and 20b. The reflecting devices or mirrors can be controlled by respective controllers 14.

In particular, each controller 14 can cause a spot configuration to radiate the surface of the electrical conductor 20 at predetermined positions and at a certain time. In addition, the controllers 14 can control the speed of the spot configuration, and hence the speed at which the surface of the electric conductor 20 is scanned by the laser beams 13'a and 13'b.

This ultimately results in controlling the speed of movement of the spot configuration along the predetermined trajectories of the surface of the electric conductor 20 where the insulation 20' needs to be removed.

Each laser source 13a and 13b is characterized by having an area range where the predetermined trajectories are contained. The different positions of the spot configuration for the scanning fall within this area range. The area ranges of the laser beams 13a and 13b need to match the removal areas 20a and 20b to remove the insulation.

These area ranges can be increased by changing the laser sources 13a, 13b, or by moving the sources farther from electric conductor 20. Furthermore, the area ranges can be located at a different position 1P, 2P along the electric conductor by moving the laser sources 13a, 13b parallel to the feeding direction of the electric conductor, through the use of movement devices 19.

The position of the area ranges needs to be predetermined with respect to spatial reference axes, like the central axis 20' of the section of electrical conductor 20 (see FIGS. 3 and 4), and the plane 16' where the cutting blade of cutting unit 16 cuts through the section of the electric conductor. This corresponds to the spot configuration radiating at a predetermined distance along the electric conductor from plane 16'.

The controllers 14 of the reflecting devices or mirrors of the laser sources 13a and 13b obtain the predetermined values of the position and speed of the spot configuration with respect to the above-mentioned references.

FIGS. 3 and 4 show the angular position of the laser sources 13a and 13b with respect to the electric conductor 20. Each laser source 13a and 13b is located in an angular position wherein a laser beam 13'a and 13'b being emitted can radiate a respective width side and a respective height side of the cross-section of the electric conductor, as shown in FIGS. 3 and 4. More particularly, the laser beam 13'a emitted by the laser source 13a can scan the width side W1 and the height side H1, whilst the laser beam 13'b of the laser source 13b can scan the width side W2 and the height side H2, with reference to the area ranges mentioned in the foregoing.

Guide passages 12a, 12b and 12c maintain the electric conductor aligned with the laser beams 13'a, 13'b during the scanning, when the electric conductor 20 moves towards the bending unit 17, as shown in FIG. 1.

Feeding unit 15 causes the electric conductor to be drawn from supply reel 10 and to be pushed towards the bending unit 17. This results in rotating the supply reel 10 to unreel the electrical conductor 20 and cause it to advance towards the bending unit 17. During the thrust exerted by the feeding unit 15, the electric conductor 20 moves with respect to the bending tool 18 and the cutting tool 16, as described in patent publication WO 2012/156066, in order to form a coil member. In particular, the electric conductor 20 is moved and made to pass through the bending tool 18 for a series of predetermined lengths of the various bending stages required for forming the configuration of the coil member. The predetermined lengths can be measured from the reference plane 16' of the cutting tool 16, or from other reference positions related to the bending stages for forming the coil member, as described in patent publication WO2012/156066.

At the end of these movements, the cutting tool 16 cuts through the section of the electric conductor 20 to detach the formed coil member. In particular, the cutting can occur at the middle of the predetermined length L of the portions 20a and 20b of the electrical conductor, where the insulation 20' has been removed.

In order to increase the rate of producing coil members by means of bending unit 17, laser unit 13 can remove the insulation during the bending stages required for forming the coil members. This requires removing the insulation 20' during the feeding movements in direction F of electric conductor 20 towards the bending unit 17, and therefore removal of insulation 20' from the electric conductor 20 when it is bent by the bending unit 17 to form the coil member.

To achieve this, the feeding movement of electric conductor 20 towards the bending unit 17 needs to be synchronized with the removal of insulation 20' occurring by means of laser beams 13'a and 13'b. In particular, the scanning of laser beams 13'a and 13'b needs to be synchronized with the feeding of electric conductor 20 towards the bending unit 17. This requires the spot configuration of the laser beams 13'a and 13'b to move along the scanning trajectories when the electric conductor 20 is moved towards the bending unit 17.

Analytically, this requires satisfying the following algebraic sum:

$$V\text{scan} = V\text{scan stat} + V\text{feed bending, where:}$$

Vscan is the speed of the spot configuration during the scanning with respect to a stationary reference, like plane 16', when the electric conductor 20 is moving towards the bending unit 17;

Vscan stat is the speed of the spot configuration during the scanning with respect to the electric conductor, i.e. the scanning speed when the electric conductor 20 is stationary, which corresponds to a scanning speed previously determined for removing the insulation 20' when the electric conductor 20 is stationary;

V feed bending is the speed of the electric conductor 20 during the various feeding stages of the bending operations performed by bending unit 17.

The sum of the speeds needs to be algebraic due to the sign of the Vscan stat parameter, which may be either positive or negative depending on whether the direction of movement of the spot configuration during the scanning is concurrent or opposite to the feeding direction of the electric conductor 20. Therefore, a change in the sign of the Vscan stat parameter dependent on the scanning trajectory occurs at a certain instant of the insulation removal stage. The negative sign will be associated with a movement of the spot configuration in a direction opposite to direction F for the feeding of electric conductor 20.

The positions of laser sources 13a and 13b along the electric conductor 20 can be chosen to correspond to a predetermined distance from reference plane 16' or another reference of the bending unit 17; therefore, the positions of laser sources 13a and 13b along the electric conductor 20 can be selected as a function of the position in which the bending operations occur. This determines the position of the area ranges of the scanning of laser beams 13'a and 13'b, so that the scanning process can occur in a predetermined position 1P, 2P with respect to a predetermined stage of the bending or cutting process.

In this way, complete removal of the insulation 20' from the removal areas 20a and 20b can be achieved. Furthermore, this will guarantee that removal areas 20a and 20b will be positioned at the reference plane 16' for cutting during a required stage of the bending process.

For example, this will ensure that cutting will occur in the middle of removal areas 20a and 20b to form exposed ends 21a and 21b of the leg portions 21" of coil member 21 shown in FIG. 2.

The positions 1P and 2P of laser sources 13a and 13b along the electric conductor 20 from reference plane 16' can correspond to a multiple integer n of the lengths of electric conductor 20 required to form a complete coil member. For example, an integer number multiplied by the length of electric conductor 20 required to form the coil member 21 of FIG. 2, i.e. the length from the cut part of the exposed end 21a to the cut part of the exposed end 21b. This can guarantee that the bending stages and the cutting will occur for predetermined feed lengths of the electric conductor 20 in direction F with respect to a reference position of the laser beams 13'a and 13'b or of the laser sources 13a and 13b.

The laser unit 15 can determine the position of the points of origin for the movement of laser beams 13'a and 13'b with respect to the cutting position and the bending position of tool 18. Scanning can start when the laser beams 13'a and 13'b are aligned with the origin to fulfill a position function between the position of removal of the insulation along the electric conductor and the bending for forming the coil member, and the cutting of the coil member.

This position function guarantees that removal of insulation 20' occurs during a predetermined stage of bending, for example when bending is occurring for a head of the hairpin 21', which can be the slowest of the bending stages. This will give adequate time for the insulation removal operation to occur. In other words, this will guarantee that the scanning speed will be sufficient for completing the removal of the insulation 20' before the required removal areas 20a, 20b of the electric conductor 20 are fed past the area ranges of the laser beams.

According to an alternative embodiment, the laser sources 13a and 13b move in the direction F synchronized with the feeding speed of the electric conductor 20. In this situation, the position of the laser beams 13'a and 13'b will at any given instant correspond to a predetermined position with respect to the reference position 16' during the movement of the laser sources 13a and 13b caused by movement devices 19, as shown in FIG. 1.

Therefore, the predetermined position of the laser beams 13'a and 13'b will change not only for the scanning movement, but also with an additional movement component, which will be due to the movement of the laser sources 13a and 13b synchronized with the feeding of the electric conductor 20. In this alternative embodiment, the movement of the laser sources 13a and 13b can occur during a predetermined bending stage, e.g. during the bending of the hairpin head. This alternative embodiment can offer the advantage of further reducing the time necessary for removing the insulation while feeding the electric conductor 20.

Figure 5:
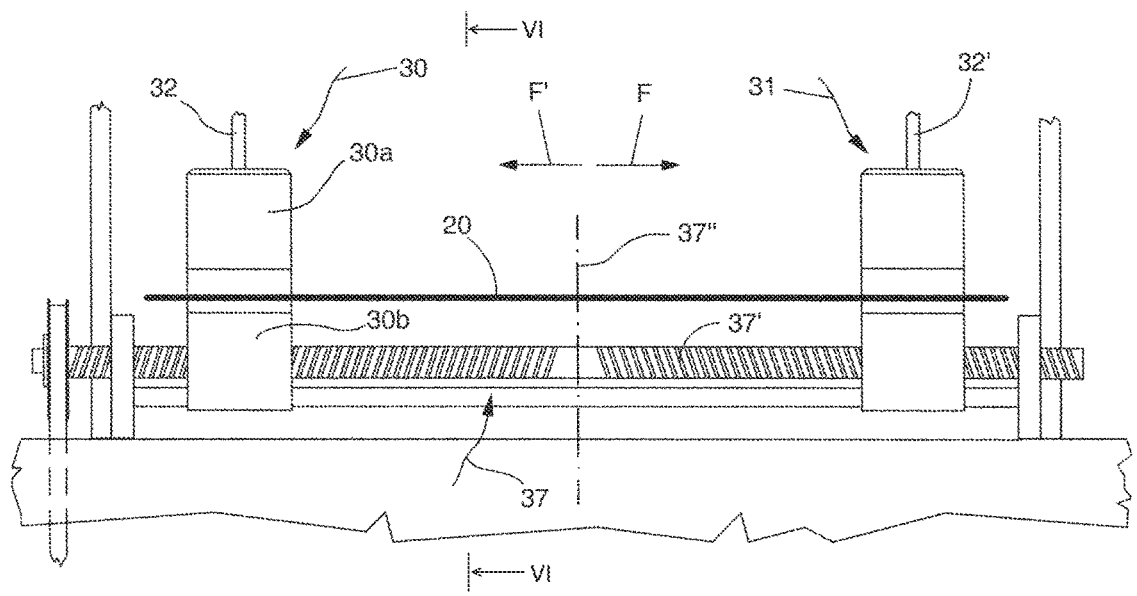
FIG. 5 is an enlarged partial view of portion 5 of FIG. 1.
Figure 6:
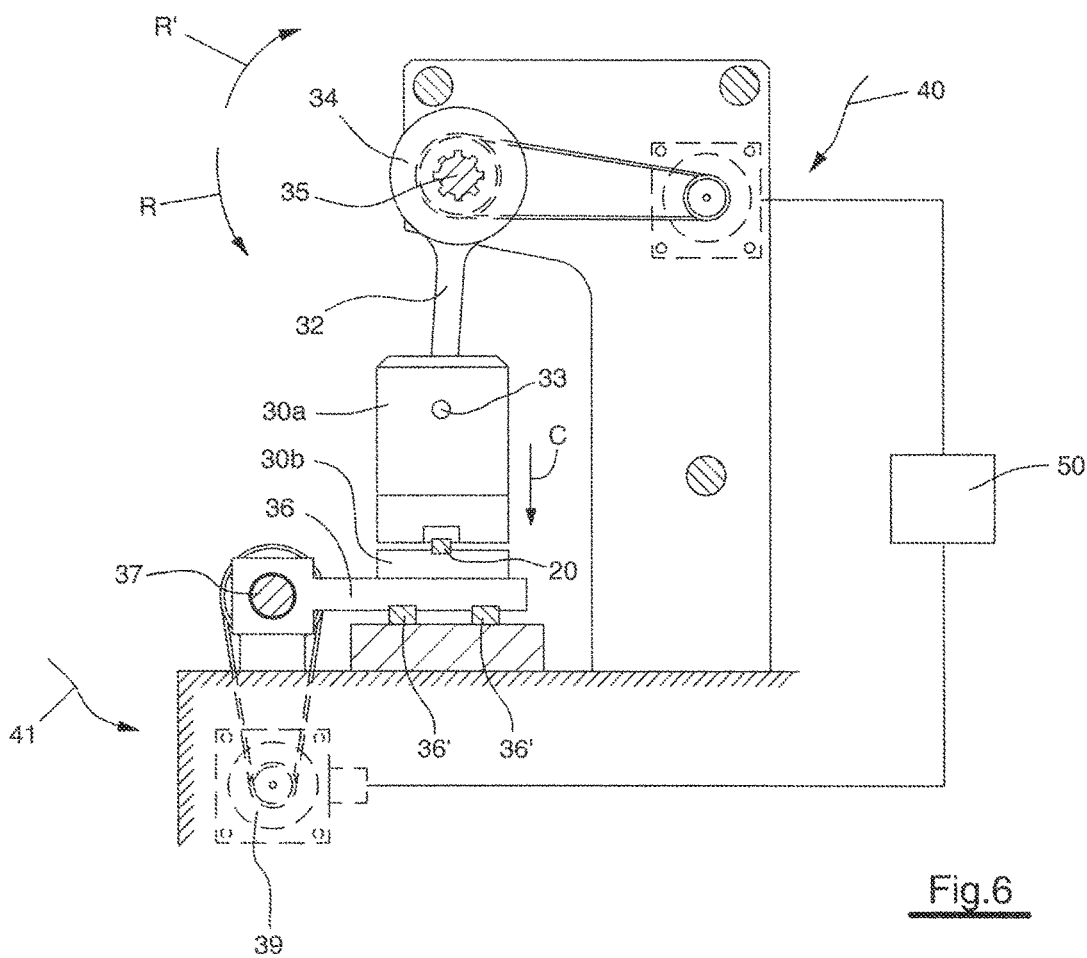
FIG. 6 is a partial sectional view from the direction of the arrows 6-6 of FIG. 5.

With reference to FIGS. 5 and 6, feeding unit 15 is provided with two clamp units 30 and 31 for clamping the electric conductor 20. Clamp units 30 and 31 are substantially identical, and therefore the detailed description will be limited to clamp unit 30.

The clamp unit 30 comprises a pair of clamps 30a and 30b, as shown in FIGS. 5 and 6, which can hold the electric conductor 20, by moving clamps 30a and 30b towards each other in direction C. An opposite movement of the clamps, i.e. away from each other, will release the electric conductor 20.

The movement of an arm 32 achieves the movement of clamp 30a for holding and releasing the electric conductor 20. More particularly, arm 32 is hinged to clamp 30a portion 33 (see FIG. 6), and arm 32 is provided with an enlarged portion 34 located on shaft 35. Shaft 35 is splined to make the enlarged portion 34 to rotate, and to allow movements in two opposite directions F and F' of enlarged portion 34. Movements of enlarged portion 34 in directions F and F' cause corresponding movements of clamp unit 30 in directions F and F'. Rotation of enlarged portion 34 in directions R and R', by rotating shaft 35, respectively cause clamping of electric conductor 20 by movement of clamp 30a in direction C, or releasing 20 of electric conductor 20 by movement of clamp 30a in direction opposite to C.

Programmable motor belt transmission 40 is provided for rotating shaft 35.

When clamp unit 30 holds electric conductor 20 and moves in direction F, a predetermined length of electric conductor 20 is fed to the bending unit 17 from supply reel 10. With clamp 30 open and following a movement in direction F', clamp unit 30 is repositioned along electric conductor 20 at the beginning of the stroke in direction F for feeding a predetermined length of electric conductor 20.

Clamp unit 30 can be moved in directions F and F' by moving trolley 36 on guide bars 36'. Clamps 30a and 30b are assembled on trolley 36, as shown in FIGS. 5 and 6. Trolley 36 is engaged with screw bar 37. Screw bar 37 is rotated by motor belt transmission 41, shown in FIG. 6, to accomplish movement of trolley 36 in directions F and F'. The motor transmission 41 is provided with an encoder 39 for transmitting the position of clamp unit 30 during the movements in direction F and F'.

As shown in FIGS. 5 and 6, clamp unit 31 is provided with parts similar to those of clamp unit 30. However, the trolley of clamp unit 31, like trolley 36, is engaged on a portion 37' of screw bar 37, having the same pitch but opposite threading to where trolley 36 of clamp unit 30 is engaged on screw bar 37. In this way, when clamp unit 30 moves in one of directions F and F', clamp unit 31 moves oppositely for same quantities in the other of directions F and F'. More particularly, clamp units 30 and 31 move simultaneously and symmetrically with respect to mid axis 37" of screw bar 37 (see FIG. 5) in opposite directions F and F', and with respect to each other. Clamp units 30 and 31 are closed when moving in direction F to feed the electric conductor 20, and open when moving in direction F' for repositioning. In other words, clamp unit 30 draws and pushes electrical conductor 20 when clamp unit 31 is open and moving in direction F'. Similarly, clamp unit 31 draws and pushes electrical conductor 20 when clamp unit 30 is open and moving in direction F'. This combination of movements, and the alternative opening and closing of the clamp units reduces dead times, when neither pushing nor pulling of electric conductor 20 occurs.

The enlarged portion (not shown) of the lever 32' of clamp unit 31 is similar to the enlarged portion 34 of lever 32, although the enlarged portion of lever 32' will be mounted on the splines of shaft 35 with an angular shift with respect to the position of enlarged portion 34. Thus, clamp unit 30 can be opened when clamp unit 31 is closed, and clamp unit 30 can be closed when clamp unit 31 is open.

Controllers 50 are configured to guarantee the sequence and values of the movements of clamp units 30 and 31, and the open and closed conditions of clamp units 30 and 31 at specific times. The objective of the controllers can consist of feeding predetermined lengths of conductor with respect to reference plane 16' and to other reference positions of the bending process. Controllers 50 can accomplish this by activating and controlling motor transmission 40 and motor transmission 41 according to programmed functions, which can be the feed displacement of electric conductor 20 for the various stages of bending, and the positioning of the clamp units 30 and 31 along electric conductor 20.

Furthermore, the feedback of encoder 39, which represents the length of conductor being fed, can be used in closed loop feedback by controllers 50 to control motor transmission 40. The programmed functions can be specific for the electric conductor 20 and the coil member that needs to be formed, and can be set in controllers 50 when setting the apparatus for the coil member to be formed.

With reference to the synchronization of the application of the laser beams 13'a and 13'b on electric conductor 20 and the feeding of electric conductor 20, as described in the foregoing, controller 50 transfers encoder data along signal lines 50' to controllers 14. This data corresponds to lengths of electric conductor being fed to the bending unit 17 by unit 15. Controllers 14 can convert the encoder data into the speed parameter Vfeed bending described in the foregoing with reference to the speed formula, and thus the controllers 14 can calculate the Vscan parameter for controlling the reflecting devices or mirror to achieve synchronization.

In other words, controllers 50 can act as a master control for controlling the feed of lengths of the electric conductor 20 in the various stages of the bending of the coil member 21, and supplying the electric conductor position information to controller 14 for the synchronization of the scanning with the feeding on behalf of unit 15.

When a coil member having a different configuration needs to be processed, the length of the coil member between the cut ends may change. In this situation, the reflecting devices or mirrors of laser sources need to accomplish scanning of the electric conductor 20 at a different distance from reference plane 16', i.e. in different positions 1P and 2P. In this situation, controller 50 will be programmed to have a different sequence of the feed of lengths of the electric conductor 20 for the various stages of the bending. In addition, the reference positions or points of origin where the laser beams 13'a and 13'b start the scanning and the position of the area ranges may need to be repositioned to ensure that the required lengths of insulation 20' will be removed from removal areas 20a and 20b, in a situation where removal areas 20a and 20b will need to be achieved at the new distances from reference planes for the bending or the cutting.

To optimize the removal of insulation 20' from the electric conductor 20, the laser beam will be chosen to have a wavelength that ensures high absorption of the radiation energy by the insulation 20', and high reflection of the radiation energy by the core of the electric conductor 20.

In addition, the pulses of the pulsed laser beam can be chosen to optimize removal as a function of the feed speed of the electrical conductor 20. The power of the heating radiation can be selected as a function of the area that needs to be scanned and of the time available for the scanning.

An alternative to using pulsed radiation and scanning can be a VCSEL laser beam, which is an abbreviation for Vertical Cavity Surface Emitting Laser. The VCSEL beam will need to be positioned at a predetermined position from the reference planes for bending or cutting. The VCSEL beam can be activated by a respective control synchronized with the feeding, at a predetermined stage of the bending process.

Naturally, without prejudice to the principle of the invention, the embodiments and the implementation details may be extensively varied from those described and illustrated herein by way of non-limiting example, without however departing from the scope of the present invention as set out in the appended claims.

The invention claimed is:
1. A method for manufacturing a stator of a dynamo-electric machine, said method comprising:
forming coil members by bending an electric conductor externally coated with an outer insulation using a coil member former, wherein the electric conductor is bent by the coil member former at predetermined lengths from a reference position of the coil member former to form at least one head portion of the coil members in the electric conductor, and wherein each one of the coil members, when formed by the coil member former, comprises a head portion and leg portions extending from said head portion;
feeding the electric conductor using a feeder to feed the electric conductor to the coil member former during the bending of the coil member;
arranging at least one laser beam to remove the insulation from predetermined areas of the electric conductor;
irradiating a surface of the electric conductor with said at least one laser beam situated at a predetermined position with respect to the reference position of the coil member former along the length of the electric conductor being fed by the feeder to remove the insulation from the predetermined areas of the electric conductor, wherein the irradiating is performed at a predetermined stage of the bending of the coil member former for forming a head portion of a coil member;
cutting the electric conductor to detach formed coil members from said electric conductor; and
inserting the leg portions of the detached coil members into slots of the stator, so that parts of said leg portions with the insulation removed extend from one end of the stator and the head portions extend from an opposite end of the stator.

2. The method according to claim 1, further comprising:
radiating said at least one laser beam on multiple zones of the predetermined areas by moving said at least one laser beam with a predetermined movement; and
synchronizing the movement of said at least one laser beam with the movement of the feeding of the electric conductor.

3. The method according to claim 2, wherein the synchronization occurs by summing a speed of movement of at least one laser beam to a speed of the movement of the feeding of the electric conductor.

4. The method according to claim 1, further comprising positioning said at least one laser beam at the predetermined position which is a predetermined distance from the reference position, wherein the predetermined distance is an integer multiple of the length of the electric conductor required to form a coil member.

5. The method according to claim 1, further comprising radiating two laser beams along the electric conductor, wherein a width side and a height side of the electric conductor are radiated by one of the laser beams, and a second width side and a second height side of the electric conductor are radiated by the other one of said laser beams.

6. The method according to claim 1, further comprising receiving said at least one laser beam on multiple portions of the predetermined areas and partially superimposing a predetermined number of adjacent parts of the multiple portions.

7. The method according to claim 1, further comprising using a pulsed laser beam.

8. The method according to claim 7 further comprising setting at least one parameter selected from the group consisting of:
a power of the laser radiation,
a frequency of the pulses of said pulsed laser radiation, and
a trajectory of the movement of the laser beam along the surface of the electric conductor.

9. The method according to claim 1, further comprising a reflecting device including a mirror configured to move the laser beam during the feeding of the electric conductor.

10. The method according to claim 1, further comprising:
bending the leg portions extending from the stator for positioning predetermined ends of the leg portions in positions adjacent one to the other; and
joining the adjacent leg portions.

11. Apparatus for manufacturing a stator of a dynamoelectric machine, said apparatus comprising:
a coil member former configured to bend an electrical conductor externally coated with an outer insulation, wherein the coil member former bends the electrical conductor at predetermined lengths from a reference position of the coil member former to form at least a head portion of the coil member in the electric conductor, wherein a coil member, when formed, comprises a head portion and leg portions extending from said head portion;
a feeder configured to feed the electrical conductor to the coil member former during the forming of the coil member;
at least one respective laser configured to generate a respective laser beam which irradiates the surface of the electrical conductor to remove the insulation from predetermined areas of the electrical conductor corresponding to the leg portions of the coil member, wherein said laser is situated at a predetermined position with respect to the reference position of the coil member former along the length of the electrical conductor being fed;
a controller configured to control the at least one laser so that the irradiating occurs at a predetermined stage of the bending of the coil member former for forming a head portion of the coil member; and
a cutter configured to cut the electrical conductor so as to detach a formed coil member from said electric conductor; and
an inserter configured to insert the leg portions of the coil members in slots of the stator, so that parts of said leg portions extend from an end of the stator and the head portions extend from an opposite end of the stator.

12. The apparatus according to claim 11, wherein the controller is further configured to:
control the at least one respective laser so that said respective laser beam irradiates multiple zones of the predetermined areas by moving said laser beam with a predetermined movement; and
synchronize the movement of said respective laser beam with the feeding movement of the electrical conductor.

13. The apparatus according to claim 12, wherein the controller is further configured to sum a speed of the movement of the respective laser beam to a speed of the movement of the feeding of the electrical conductor.

14. The apparatus according to claim 11, wherein said at least one respective laser is positioned at the predetermined position which is a predetermined distance from the reference position, wherein the predetermined distance is an integer multiple of the length of the electrical conductor required to form a coil member.

15. The apparatus according to claim 11, wherein said at least one respective laser is configured to emit two laser beams radiated along the electrical conductor, wherein a width side and a height side of the electrical conductor are irradiated by one of said laser beams, and a second width side and a second height side of the electrical conductor are irradiated by the other one of said laser beams.

16. The apparatus according to claim 11, wherein the controller is further configured to control said respective laser beam to irradiate multiple portions of the predetermined areas, and to partially superimpose a predetermined number of adjacent parts of the multiple portions.

17. The apparatus according to claim 11, wherein said at least one respective laser is configured for emitting said respective laser beam in a pulsed manner.

18. The apparatus according to claim 11, wherein the controller is further configured to set at least one parameter selected from the group consisting of:
a power of the laser radiation,
a frequency of the pulses of the pulsed laser radiation, and
a trajectory of the movement of said respective laser beam along the surface of the electrical conductor.

19. The apparatus according to claim 11, further comprising a a reflecting device including a mirror configured to move the at least one laser during the feeding of the electrical conductor.

* * * * *